United States Patent Office 3,373,178
Patented Mar. 12, 1968

3,373,178
ALKALI METAL TETRAKIS (TRIORGANOSILOXY AND -SILYLAMINO) METAL III SALTS
Max Schmidt and Hubert Schmidbaur, Marburg, Germany, assignors to Wasag-Chemie Aktiengesellschaft, Essen, Germany
No Drawing. Filed Mar. 19, 1963, Ser. No. 266,172
Claims priority, application Germany, Aug. 18, 1962, W 32,807, W 32,808
10 Claims. (Cl. 260—429)

The present invention relates to an organosilicon compound and a method of making the same, as well as to a method of making a compound which may be used as an intermediary compound in making the first mentioned organosilicon compound, and to such intermediary compound.

The intermediary compound may also be used as an additive in connection with a fuel for combustion engines and as an additive for rocket fuels, and the first mentioned organosilicon compound is particularly suitable for such purposes.

Thus, it is possible, for instance, to achieve a favorable effect on the combustion processes of composite solid rocket fuels (for instance of the type based on perchlorate or ammonium nitrate-synthetic resin binder) by incorporating in the solid rocket fuel about 0.2% by weight of the non-ionized or salt-like ferrosiloxanes which will be described further below.

The compounds with which the present invention is concerned can be classified as hetero-siloxanes and hetero-silazanes.

It has been described previously to produce one of the hetero-siloxanes, namely aluminum siloxane by reaction of a polysiloxane with an aluminum alkyl.

However, this reaction is difficult to control, requires high temperatures and gives only a modest yield. Other methods which were proposed for producing aluminum siloxanes also do not lend themselves to producing other siloxanes.

It is therefore an object of the present invention to provide hetero-siloxanes and silazanes, including salt-like compounds of this type, and to do so in a simple and economical manner.

Other objects and advantages of the present invention will become apparent from a further reading of the description and of the appended claims.

With the above and other objects in view, the present invention contemplates an organosilicon compound of the formula

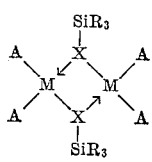

wherein M represents a metal selected from the group consisting of Ga, Fe and Co, X is selected from the group consisting of O and NH, R is selected from the group consisting of alkyl and cycloalkyl groups containing up to 6 carbon atoms, alkenyl and alkinyl hydrocarbon radicals containing up to 6 carbon atoms, mononuclear aryl radicals and monophenylated derivatives of saturated and unsaturated hydrocarbons containing up to 4 carbon atoms, and members of these groups which are between 1 and 4 times substituted with at least 1 substituent selected from the group consisting of nitro groups, amino groups and halogens, and A is selected from the group consisting of alkyl and cycloalkyl groups containing up to 6 carbon atoms, alkanyl and alkinyl hydrocarbon radicals containing up to 6 carbon atoms, mononuclear aryl radicals and monophenylated derivatives of saturated and unsaturated hydrocarbons containing up to 4 carbon atoms, and members of these groups which are between 1 and 4 times substituted with at least 1 substituent selected from the group consisting of nitro groups, amino groups and halogens, and of members of the group having the formula $R_3 Si X$ wherein R and X have the meaning defined hereinabove.

The present invention is also concerned with an organosilicon compound which may be produced by further reacting the above described compound and which is of the formula

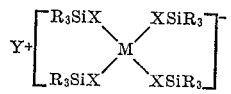

wherein M represents a metal selected from the group consisting of Al, Ga, Fe and Co, Y represents an alkali metal, X is selected from the group consisting of O and NH, and R is selected from the group consisting of alkyl and cycloalkyl groups containing up to 6 carbon atoms, alkenyl and alkinyl hydrocarbon radicals containing up to 6 carbon atoms, mononuclear aryl radicals and monophenylated derivatives of saturated and unsaturated hydrocarbons containing up to 4 carbon atoms, and members of these groups which are between 1 and 4 times substituted with at least 1 substituent selected from the group consisting of nitro groups, amino groups and halogens.

According to the method of the present invention, the organosilicon compound of the formula

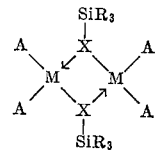

may be produced by reacting a compound of the formula $MHal_nR_{3-n}$ with a compound of the formula $YXSiR_3$ wherein Y represents an alkali metal, Hal represents a halogen, $n$ represents an integer of between 1 and 3, and M, R and X have the meaning described above.

Furthermore, the present invention is concerned with the method of producing an organosilicon compound of the formula

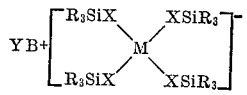

wherein M represents a metal selected from the group consisting of Al, Ga, Fe and Co, Y represents an alkali metal, X is selected from the group consisting of O and NH, and R is selected from the group consisting of alkyl and cyclo-alkyl groups containing up to 6 carbon atoms, alkenyl and alkinyl hydrocarbon radicals containing up to 6 carbon atoms, mononuclear aryl radicals and monophenylated derivatives of saturated and unsaturated hydrocarbons containing up to 4 carbon atoms, and members of these groups which are between 1 and 4 times substituted with at least 1 substituent selected from the group consisting of nitro groups, amino groups and halogens, comprising the step of reacting a compound of the formula

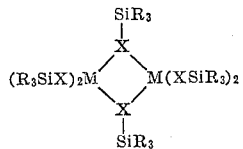

with a compound of the formula $BXSiR_3$.

Thus, according to the present invention, it is possible to produce in a simple manner and with a good yield organo-siloxanes and organo-silazanes which include hetero-atoms such as aluminum, gallium, iron, cobalt and the like.

Compounds of the general formula

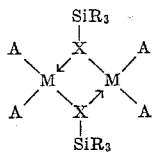

wherein (as throughout the entire specification) M, X and A have the meaning described above may be produced according to the present invention either by reacting compounds of the formula $MHal_nR_{3-n}$ with compounds of the formula $YXSiR_3$, wherein, (as throughout the entire specification) Y represents an alkali metal, Hal a halogen and N an integer number between 1 and 3 inclusive; or by reacting a compound of the formula $R_3SiXMHal_2$ with an alkylating agent or with a compound of the formula $YXSiR_3$.

The above described methods can be used in a broad manner, i.e., with many different substituents, as indicated above. All conventional alkylating agents may be used, for instance, metal alkyls such as lithium alkyl, sodium alkyl and the like, however, also other alkylating agents such as dimethyl sulfate, Grignard compounds, etc. The reaction is carried out in a conventional solvent, preferably an ether-type solvent such as diethylether, dioxane, tetrahydrofurane or morpholine, or in aromatic hydrocarbons such as benzene, toluene and the like.

As pointed out above, many variations of substituents are possible and the organic groups may be additionally substituted with nitro groups or nitro amino groups. Frequently it is preferred to operate so that Hal is chlorine, R and A, respectively, each is an alkyl, X is oxygen and Y is sodium.

When using as a constitutent of the reaction a compound or compounds of the formula $YXSiR_3$, it is also possible to use mixtures of compounds which include a variety of alkali metals.

The metal halide-organosilanolates or silazolates are compounds known per se and described for instance in J. Am. Chem. Soc. 68, 2282 (1946); U.S. Patent 2,472,799; and British Patent 631,506.

The following examples are given as illustrative, without, however, limiting the invention to the specific details of the examples.

EXAMPLE I

*Bis-pentamethylsiloxalane*

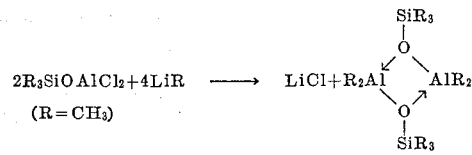

A solution of 21.6 g. (0.115 mol) trimethylsiloxi-aluminum dichloride in 150 ml. of absolute diethylether is reacted by dropwise introduction of about 5 g. (0.23 mol) lithium methylate under ice cooling, exclusion of moisture and a nitrogen atmosphere.

The reaction mixture is allowed to stand for about 20 hours at room temperature. Thereafter, the ether is evaporated under vacuum. The thus obtained oily residue is distilled under an oil pump vacuum at a bath temperature of between 100 and 150° C. The major portion of the distillate will crystallize upon standing. The crystals are washed with a very small amount, about 0.5 cm.³, of petroleum ether and dried under vacuum. If necessary, the product may be further purified by vacuum sublimation.

A yield of about 10 g., about 60% of the theoretical yield is obtained. The melting point of the product is 45.5° C. and the boiling point 81.5° C. at a pressure of 10 mm.

By replacing the above starting material with aluminumdichloridetrimethylsilazanate, $(CH_3)_3SiNHAlCl_2$, and otherwise proceeding as described above, bis-pentamethylsilazalane is obtained.

The two reactions described above can also be carried out with equal simplicity and a high yield by replacing lithium methylate with dimethyl sulfate as the alkylating agent.

EXAMPLE II

*Bis-trimethyl-diethylsiloxalane*

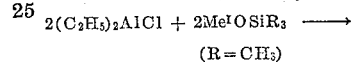

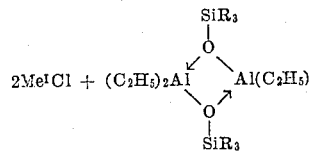

23.3 g. (0.193 mol) diethylaluminumchloride are dissolved in a 250 ml. three-necked flask under nitrogen in about 100 ml. cyclohexane. Under magnetic stirring and within a period of one hour, a solution of 7.8 g. (0.081 mol) lithiumtrimethylsilanolate and 12.9 g. (0.018 so-diumtrimethylsilanolate dissolved in ether is added drop by drop. After stirring for two hours, the solution is separated from the precipitated salt mixture (LiCl and NaCl) by suction filtration under nitrogen and thereafter distilled under vacuum, whereby at first the solvent mixture will be evaporated. Thereafter, at a pressure of 1 mm., the thus formed compound can be distilled off at about 119° C. The yield amounts to about 27 g. or 80% of the theoretical yield.

Similar good results and a substantially equal yield is obtained by replacing in the above described reaction the diethylaluminumchloride with diphenylaluminumchloride.

EXAMPLE III

*Tris-trimethylsiloxi-aluminum*

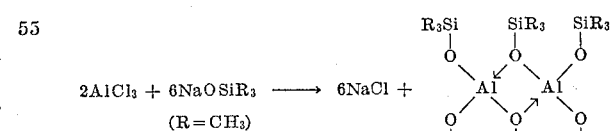

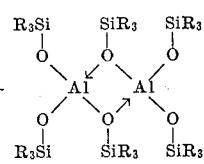

3.85 g. aluminum chloride are dissolved in 15 ml. dry diethylether and the thus formed solution is added to a solution of 9 g. sodiumtrimethylsilanolate in 25 ml. ether. The reaction mixture is heated for two hours under reflux in a nitrogen atmosphere at a temperature of about 35° C. During the reflux heating, sodium chloride precipitates and is thereafter separated from the solution by filtration. Thereafter, ether is distilled off under vacuum and the remaining reaction product sublimated at 1 mm. pressure at a temperature of between 140 and 155° C. The sublimated product in the form of colorless crystals is excellently soluble in organic solvents, has a melting point of 238° C. and is recovered in a yield of 6.8 g., equal to about 80% of the theoretical yield.

EXAMPLE IV

*Tris-trimethylsiloxi-iron*

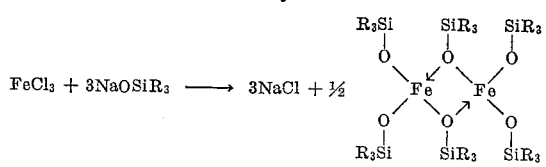

A solution of 1.93 g. dry iron-III-chloride in 15 mm. ether is added at ambient temperature to a solution of 4.1 trimethylsilanolate in 25 mm. dry diethylether. The mixture is stirred for one hour and separated by filtration under nitrogen from the precipitated sodium chloride. The solvents are then distilled off under vacuum. The residual product is sublimated at about 130° C. and has a melting point of 180° C.

EXAMPLE V

*Tris-trimethylethylsiloxi-iron*

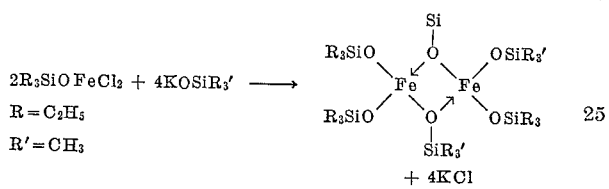

By reacting under nitrogen, in a manner similarly to that described in the preceding examples, two mols of triethylsiloxi-iron-dichloride dissolved in ether with four mols of potassiumtrimethylsiloxanate, tris-trimethylethylsiloxi-iron is obtained in a similarly high yield.

EXAMPLE VI

*Bis-pentamethylsiloxigallate*

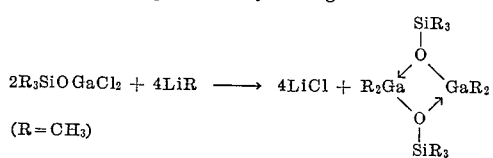

By carrying out the above reaction in the manner described in Example I, a high yield of bis-pentamethylsiloxigallate is obtained.

The compounds which can be produced in the manner described in Examples I–VI include bispentamethylsiloxalane
bispentapropylsiloxalane
bispentaethenylsiloxalane
bispenta-1-nitropentylsiloxalane
bispentaphenylsiloxalane
bispentacyclohexylsiloxalane
bis-trimethyl-dihexylsiloxalane
bispentaethylsilazalane
bispentapropinylsilazalane
bispenta-p-aminophenylsilazalane
bispentatrinitrophenylsilazalane
bispentamethylsiloxane-iron
bispentatolylsiloxane-iron
bispenta-propenylphenylsiloxane-iron
tris-trimethylsiloxi-aluminum
tris-triethylsilazane-iron
bispentamethylsiloxgallate
bispentaphenylsiloxgallate
bispentamethyl-silazane-gallium The compounds described hereinabove are excellently suitable as an intermediary or starting material for producing compounds of the general formula

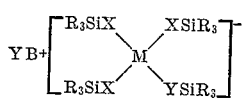

Such compounds may be produced by reacting compounds of the formula

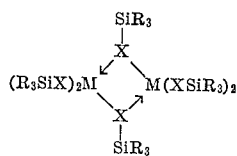

with compounds of the formula YXSiR$_3$; or by reacting compounds of the formula MHal$_3$ with compounds of the formula YXSiR$_3$.

These methods give a very good yield of the product in pure crystalline form. Again, many substituted reactants may be chosen as has been described further above, and very good results are obtained with compounds in which M represents aluminum, R represents an alkyl group, X represents oxygen, Y represents sodium and Hal represents chlorine.

The starting products of the formula

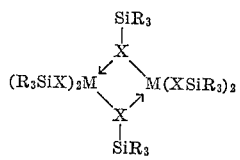

may be produced as described further above, for instance in accordance with the preceding examples.

EXAMPLE VII

*Sodium-tetrakis-trimethylsiloxi-aluminum*

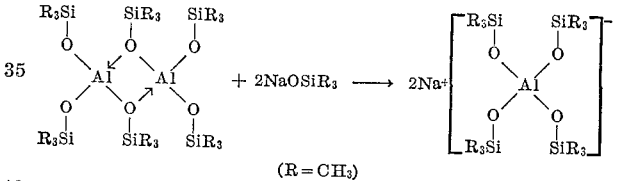

(R = CH$_3$)

0.45 g. tris-trimethylsiloxi-aluminum and 0.175 g. sodium trimethylsilanolate, respectively are each dissolved in 4 ml. carbontetrachloride and the solutions are combined. The thus formed mixture is heated for one hour under reflux and thereafter the solvent is distilled off under vacuum. In this manner 0.62 g. equal to substantially 100% of the theoretical yield of the desired compound are obtained in pure form.

In a similar manner, it is possible to produce the lithium or the potassium salt, and instead of carbontetrachloride it is possible to use other solvents such as benzene, cyclohexane or diethylether.

The gallium compounds corresponding to the above described aluminum compound and its salts can be produced in equally high yield in a similar manner from the gallium compounds corresponding to the aluminum compounds described as starting material in the present example.

EXAMPLE VIII

*Sodium-tetrakis-trimethylsiloxi-iron(III)*

This compound may be produced in good yield by one of the following reactions:

(I)

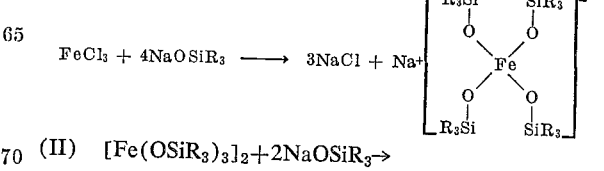

(II) [Fe(OSiR$_3$)$_3$]$_2$ + 2NaOSiR$_3$ →

2Na$^+$[Fe(OSiR$_3$)$_4$]$^-$

The method according to (I) may be carried out by combining at ambient temperature a solution of 1 g. FeCl$_3$ in 20 ml. diethylether with a solution of 2.8 g. sodiumtrimethylsilanolate in 20 ml. diethylether. Thereby, in an exothermic reaction, a colorless precipitate is formed which is then dried under vacuum. The precipitate consists of a stoichiometric mixture of the new compound and sodium chloride. A quantitative yield of 3.8 g. is obtained.

The salt-type hetero-siloxane may be separated from this mixture, due to its lesser solubility, for instance by extraction of the mixture with diethylether.

EXAMPLE IX

*Sodium-tetrakis-triethylsiloxi-cobalt(III)*

The above compound is obtainable in nearly quantitative yield in accordance with the formula

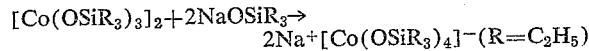

by proceeding substantially as described in Example VII.

$[Co(OSiR_3)_3]_2$ can be produced by reacting in a nitrogen atmosphere 2 mols of $CoCl_3$ dissolved in ether with 6 mols of $NaSiR_3$.

The corresponding gallium compound can be produced in the manner described above, or by a reaction in accordance with the following equation:

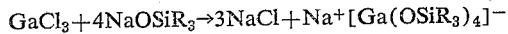

EXAMPLE X

*Sodium-tetrakis-trimethylsilazanate*

This colorless compound can be produced substantially in the manner described in Example VIII, in accordance with the following equation:

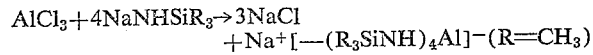

The compounds which can be produced substantially in the manner described in Examples VII–X include the following:

sodium-tetrakis-trimethylsiloxialanate
potassium-tetrakis-triethylsiloxialanate
lithium-tetrakis-triphenylsiloxialanate
sodium-tetrakis-tricyclohexylsiloxi-iron
sodium-tetrakis-tripropenylsiloxi-iron
sodium-tetrakis-tri-trinitrophenylsiloxi-iron
sodium-tetrakis-triethylsiloxi-cobalt
sodium-tetrakis-triethylsiloxi-gallium
sodium-tetrakis-tri-p-aminophenylsiloxialanate
sodium-tetrakis-tri-ethinylsiloxialanate
sodium-tetrakis-tri-trichlorpentylsiloxialanate
sodium-tetrakis-tritolylsiloxialanate
sodium-tetrakis-trimethylsilazalanate
sodium-tetrakis-triphenylsilazalanate.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. As a new composition of matter, an organo-silicon compound of the formula

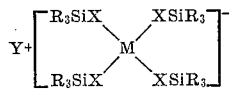

wherein M represents a metal selected from the group consisting of Al, Ga, Fe and Co, Y represents an alkali metal, X is selected from the group consisting of O and NH, and R is selected from the group consisting of alkyl and cycloalkyl groups containing up to 6 carbon atoms, alkenyl and alkinyl hydrocarbon radicals containing up to 6 carbon atoms, mononuclear aryl radicals and monophenylated derivatives of saturated and unsaturated hydrocarbons containing up to 4 carbon atoms, and members of these groups which are between 1 and 4 times substituted with at least 1 substituent selected from the group consisting of nitro groups, amino groups and halogens.

2. As a new composition of matter, an organo-silicon compound of the formula

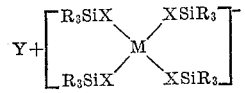

wherein M represents aluminum, Y represents an alkali metal, X is selected from the group consisting of O and NH, and R is selected from the group consisting of alkyl and cycloalkyl groups containing up to 6 carbon atoms, alkenyl and alkinyl hydrocarbon radicals containing up to 6 carbon atoms, mononuclear aryl radicals and monophenylated derivatives of saturated and unsaturated hydrocarbons containing up to 4 carbon atoms, and members of these groups which are between 1 and 4 times substituted with at least 1 substituent selected from the group consisting of nitro groups, amino groups and halogens.

3. As a new composition of matter, an organo-silicon compound of the formula

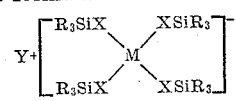

wherein M represents gallium, Y represents an alkali metal, X is selected from the group consisting of O and NH, and R is selected from the group consisting of alkyl and cycloalkyl groups containing up to 6 carbon atoms, alkenyl and alkinyl hydrocarbon radicals containing up to 6 carbon atoms, mononuclear aryl radicals and monophenylated derivatives of saturated and unsaturated hydrocarbons containing up to 4 carbon atoms, and members of these groups which are between 1 and 4 times substituted with at least 1 substituent selected from the group consisting of nitro groups, amino groups and halogens.

4. As a new composition of matter, an organosilicon compound of the formula

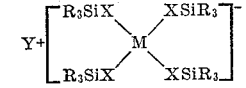

wherein M represents iron, Y represents an alkali metal, X is selected from the group consisting of O and NH, and R is selected from the group consisting of alkyl and cycloalkyl groups containing up to 6 carbon atoms, alkenyl and alkinyl hydrocarbon radicals containing up to 6 carbon atoms, mononuclear aryl radicals and monophenylated derivatives of saturated and unsaturated hydrocarbons containing up to 4 carbon atoms, and members of these groups which are between 1 and 4 times substituted with at least 1 substituent selected from the group consisting of nitro groups, amino groups and halogens.

5. As a new composition of matter, an organosilicon compound of the formula

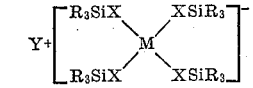

wherein M represents cobalt, Y represents an alkali metal, X is selected from the group consisting of O and NH, and R is selected from the group consisting of alkyl and cycloalkyl groups containing up to 6 carbon atoms, alkenyl and alkinyl hydrocarbon radicals containing up to 6 carbon atoms, mononuclear aryl radicals and monophenylated derivatives of saturated and unsaturated hydrocarbons containing up to 4 carbon atoms, and members of these groups which are between 1 and 4 times substituted with at least 1 substituent selected from the group consisting of nitro groups, amino groups and halogens.

6. As a new composition of matter, an organosilicon compound of the formula

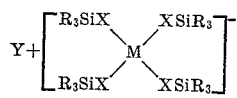

wherein M represents aluminum, Y represents sodium, X represents oxygen, and R represents an alkyl.

7. A method of producing an organosilicon compound of the formula

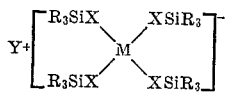

wherein M represents a metal selected from the group consisting of Al, Ga, Fe and Co, Y represents an alkali metal, X is selected from the group consisting of O and NH, and R is selected from the group consisting of alkyl and cycloalkyl groups containing up to 6 carbon atoms, alkenyl and alkinyl hydrocarbon radicals containing up to 6 carbon atoms, mononuclear aryl radicals and monophenylated derivatives of saturated and unsaturated hydrocarbons containing up to 4 carbon atoms, and members of these groups which are between 1 and 4 times substituted with at least 1 substituent selected from the group consisting of nitro groups, amino groups and halogens, comprising the step of reacting a compound of the formula

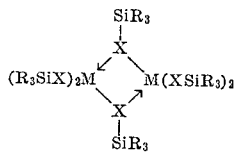

with a compound of the formula $YXSiR_3$.

8. A method of producing an organosilicon compound of the formula

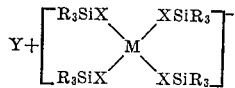

wherein M represents a metal selected from the group consisting of Al, Ga, Fe and Co, Y represents an alkali metal, X is selected from the group consisting of O and NH, and R is selected from the group consisting of alkyl and cycloalkyl groups containing up to 6 carbon atoms, alkenyl and alkinyl hydrocarbon radicals containing up to 6 carbon atoms, mononuclear aryl radicals and monophenylated derivatives of saturated and unsaturated hydrocarbons containing up to 4 carbon atoms, and members of these groups which are between 1 and 4 times substituted with at least 1 substituent selected from the group consisting of nitro groups, amino groups and halogens, comprising the steps of reacting a compound of the formula $MHal_3$ with a compound of the formula $YXSiR_3$, wherein Hal represents a halogen and M, R, X and Y have the meaning defined hereinabove.

9. A method as defined in claim 7 wherein M represents aluminum, R represents an alkyl, X represents oxygen and Y represents sodium.

10. A method according to claim 8 wherein M represents aluminum, R represents an alkyl, X represents oxygen, Y represents sodium and Hal represents chlorine.

References Cited

UNITED STATES PATENTS 3,030,398    4/1962    Shapiro et al. _____ 260—429

OTHER REFERENCES

Schmidbaur et al.—"Angew. Chem."—vol. 74 (1962), p. 589.

Schmidbaur et al.—"J. Am. Chem. Soc."—vol. 84 (1962), pp. 3600–1.

Brown et al.—"J. Chem. Soc."—vol. 80 (1958), p. 5372.

Andrianov et al.—"Izvest. Akad. Nauk SSSR (1959), No. 3, p. 446.

Zeiss—"Organo Metallic Chemistry"—A.C.S. Monograph 147, New York (1960), p. 199, Reinhold Publishing Corp., New York.

TOBIAS E. LEVOW, *Primary Examiner.*

HELEN M. McCARTHY, *Examiner.*

A. P. DEMERS, *Assistant Examiner.*